April 2, 1968  T. S. REINKE  3,375,547
APPARATUS FOR SEPARATING SEAFOOD COMPONENTS
Filed Feb. 4, 1966
3 Sheets-Sheet 1
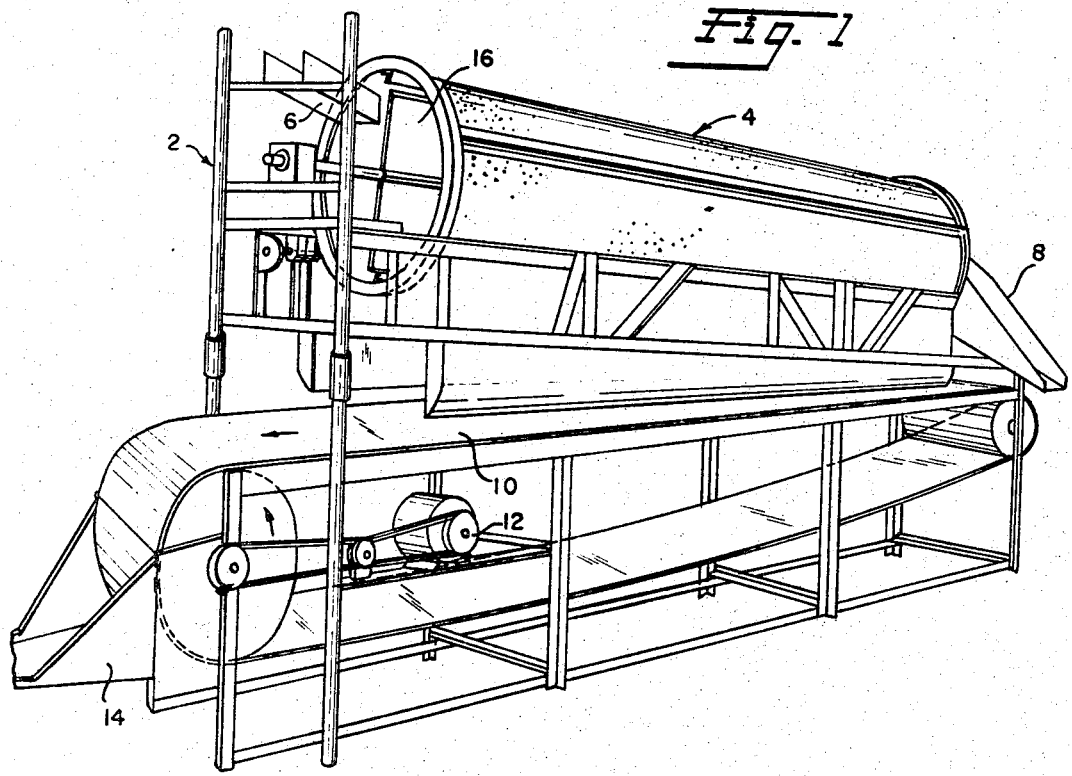
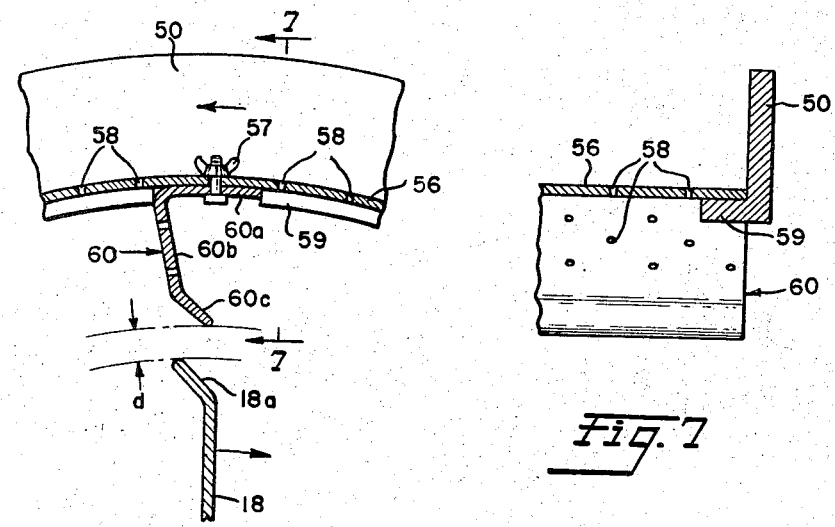
INVENTOR
THEODORE S. REINKE
BY
Scrivener Parker Scrivener & Clarke
ATTORNEY April 2, 1968         T. S. REINKE         3,375,547
APPARATUS FOR SEPARATING SEAFOOD COMPONENTS
Filed Feb. 4, 1966         3 Sheets-Sheet 2
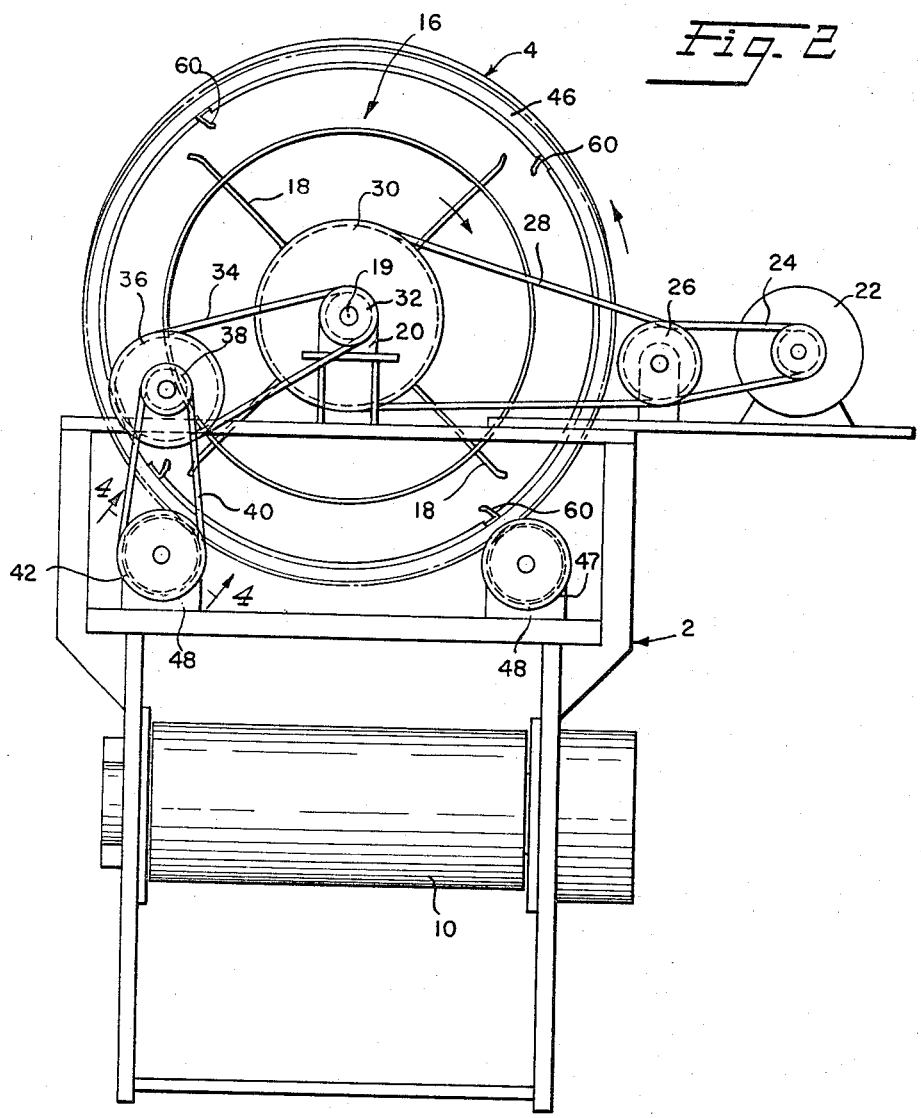
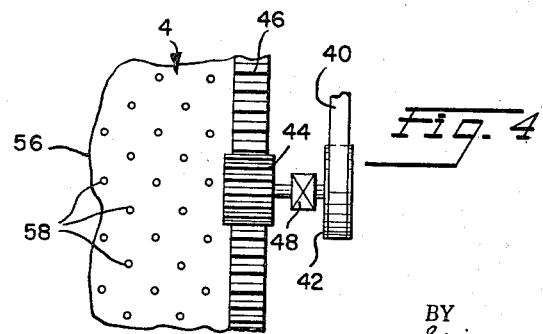
INVENTOR
THEODORE S. REINKE
BY *Scrivener Parker Scrivener & Clarke*
ATTORNEYS April 2, 1968
T. S. REINKE
3,375,547
APPARATUS FOR SEPARATING SEAFOOD COMPONENTS
Filed Feb. 4, 1966
3 Sheets-Sheet 3
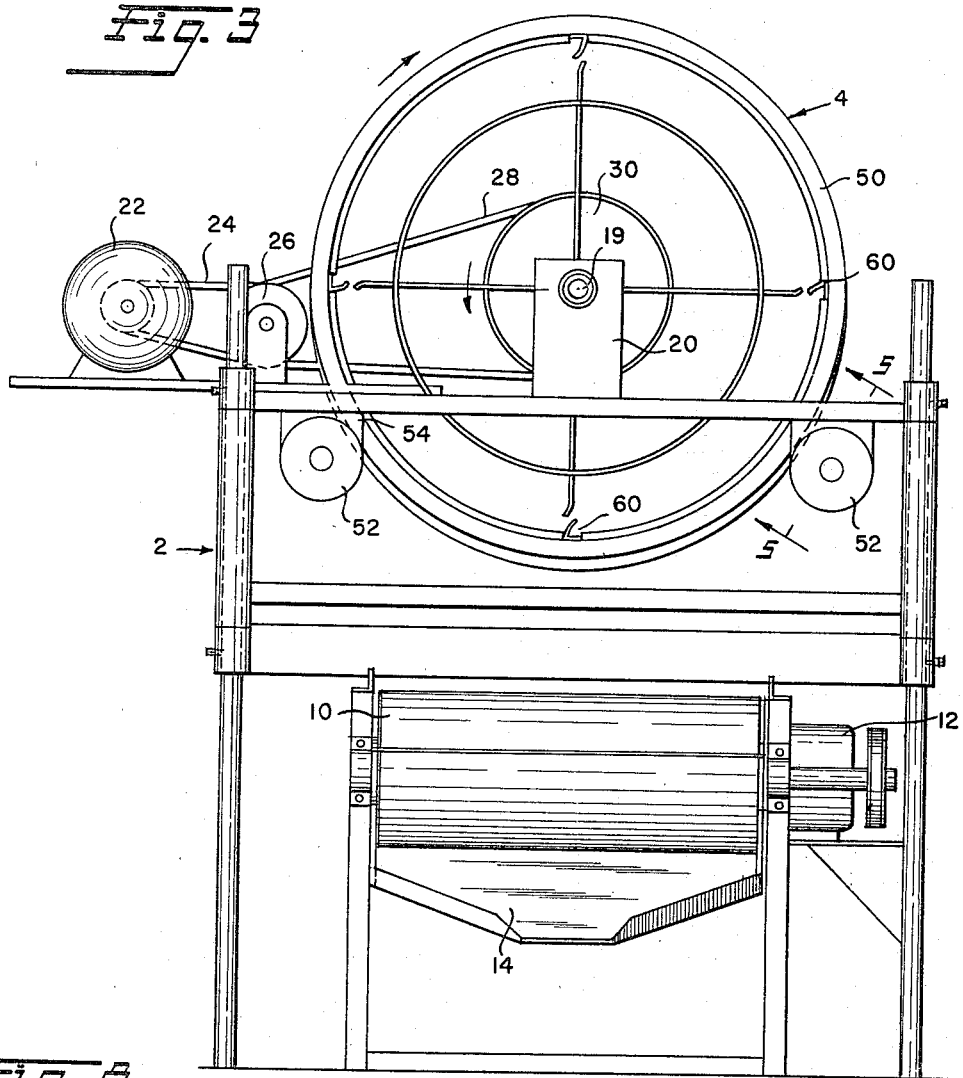
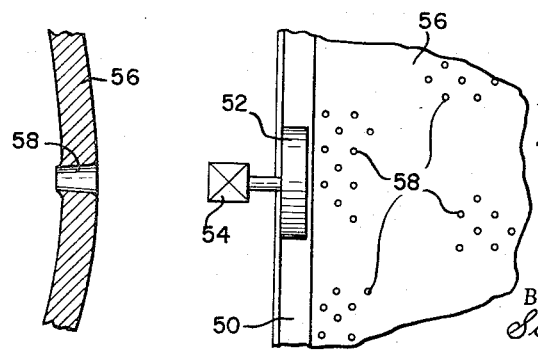
INVENTOR
THEODORE S. REINKE
BY *Scrivener Parker Scrivener + Clarke*
ATTORNEYS

United States Patent Office 3,375,547
Patented Apr. 2, 1968

3,375,547
APPARATUS FOR SEPARATING
SEAFOOD COMPONENTS
Theodore S. Reinke, Box 335,
Cambridge, Md. 21613
Filed Feb. 4, 1966, Ser. No. 525,015
7 Claims. (Cl. 17—2)

This invention relates to apparatus for separating precooked unshelled crab particles into their crab meat and shell components, said invention being characterized by the use of counter-rotating concentrically arranged tubular drum and cylindrical blade means.

In the automated apparatus developed recently for removing edible crab meat from precooked crab bodies, machines have been proposed for cutting or punching from the crab bodies the central core portions containing the premium back fin parts of the crab. The remaining non-premium crab particles, including primarily the legs, claws and adjacent portions of the body, were previously manually cracked and separated into their meat and shell components by laborious and time-consuming procedures. Owing to the rather high cost of labor involved in obtaining the relatively small amount of usable meat from these rather low valued crab particles, this final processing appears at times to be impractical and not economically justified. The present invention was developed to provide apparatus for automatically and inexpensively separating these previously low valued crab particles into their crab meat and shell components.

The primary object of the present invention is to provide apparatus for separting precooked crab particles into their crab meat and shell components, said apparatus being characterized by the provision of counter-rotating concentrically spaced perforated drum and cylindrical blade means. The drum includes on its inner periphery longitudinally extending circumferentially spaced bars that terminate in spaced relationship relative to the free extremities of the radial blades of the aforementioned blade means. The annular space between the bars and blades is so selected that the jostling and tumbling of the crab particles introduced therein will effect the aforesaid separation of the meat from the shell without mangling, crushing or otherwise damaging the meat flakes. The shell (i.e., waste) particles are conducted longitudinally through the drum and are discharged from one end thereof. The meat flakes on the other hand pass radially outwardly through perforations or meat conducting passages contained in the drum, and are deposited by gravity upon endless conveyor means arranged beneath the drum.

According to a more specific object of the invention, the free extremities of the bars are bent rearwardly relative to the direction of rotation of the drum. These bars are detachably fastened to the inner circumference of the drum and are removable for cleaning. Moreover, the free ends of the blades are bent in the rearward direction relative to the direction of rotation of the blade means, further improving the jarring or tumbling forces imparted to the crab particles to separate the same into their meat and shell components. In order to additionally improve the separation of the components, the meat transporting passages diverge in the radial outward direction of the drum, whereby the meat component is quickly funnelled from the shell to avoid crushing. Owing to the bent configuration of the blade means and the divergency of the radial passages, the formation of shell fragments that would otherwise be mixed with the meat component is avoided.

A more specific object of the invention is to provide improved means for journalling the tubular perforated drum in the frame and for rotatably driving the drum. In accordance with the invention, at one end the drum includes a ring gear which is driven by a pinion gear that in turn is driven by motor-pulley-belt drive means. At the other end, the drum is rotatably supported by roller, disk or other means journalled in the frame. The blade means includes a shaft journalled in fixed bearings on the frame. As a consequence of the simplified construction of the present invention, the subject apparatus may be rather inexpensively constructed, operated and maintained, and has proven to be quite efficient in operation.

Other objects and advantages of the invention will become apparent from a study of the following specification when considered in conjunction with the accompanying drawing, in which:

FIGURE 1 is a perspective view, with certain parts removed for clarity, of the crab meat separating apparatus;

FIGURE 2 is an end elevational view of the shell discharge end of the apparatus, certain parts being removed for the sake of clarity;

FIGURE 3 is an end elevational view of the inlet end of the apparatus;

FIGURE 4 is a detailed view of the tubular member drive gear means taken along line 4—4 of FIGURE 2;

FIGURE 5 is a detailed view of the tubular member rotational end support means taken along line 5—5 of FIGURE 3;

FIGURE 6 is a detailed sectional view showing the relationship between one blade of the blade means and one bar of the tubular member;

FIGURE 7 is a detailed sectional view taken along line 7—7 of FIGURE 6; and

FIGURE 8 is a detailed sectional view of one crab meat transporting passage contained in the tubular member.

Referring first more particularly to FIGURE 1, the crab meat separating apparatus includes a rigid frame 2 in which is journalled a generally horizontal tubular drum 4 having an input end into which precooked unshelled crab particles are introduced via supply chute 6, and an output end from which the shell components are discharged via discharge chute 8. The drum 4 contains throughout its length a plurality of perforations or meat conducting passages, through which crab meat chunks or flakes are radially passed for deposition by gravity upon the endless conveyor belt 10. The crab meat components deposited upon the conveyor, which is driven by the motor 12, are transported forwardly of the apparatus a sufficient distance to permit manual inspection for grading and shell inspection, and are deposited in the meat bin 14.

Also journalled in frame 2 in concentrically spaced relation within the tubular drum 4 are cylindrical blade means 16 including a plurality of interconnected radial blades 18 that extend longitudinally the length of drum 4. As shown in FIGURES 2 and 3, the blade means includes a shaft 19 journalled in bearings 20 supported by the frame. The blade means 16 are driven in the direction shown by the arrows by the motor 22, endless belt 24, idler pulley 26, endless belt 28, and pulley 30 secured to shaft 19. The drum 4 is driven in the opposite direction of rotation by pulley 32 on shaft 19, endless belt 34, idler pulleys 36, 38, endless belt 40, and pulley 42. Preferably the speed of rotation of the blade means is two to four times greater than the rotational speed of the drum. If desired, conventional speed adjustment means (for example, clutch and brakes, differential gearing, or clutch and alternate pulley and belt arrangements, not shown) may be provided, in one or both of the drive trains to vary the relative rotational speeds of the drum and beater means, whereby the operator may compensate for differences in size, type or degree of cooking of the crab batch. Connected with the shaft of this pulley 42 is a pinion gear 44 (FIGURE 4) which meshes with the teeth of a ring gear 46 forming one end (the discharge end) of drum 4. The discharge end of drum 4 is further supported by idler pinion 47 which engages ring gear 46. The shafts of both pinion gears are journalled in bearings 48 supported on frame 2, at the inlet end, drum 4 has an end ring 50 supported by a pair of disks 52 journalled in frame bearings 54. The perforated body portion 56 of drum 4 comprises a metal sheet (for example, a one-eighth inch steel sheet) containing through holes or passages 58 on the order of five-eighths to three-quarters inch in diameter, said holes or passages being divergent in the radial outward direction of the drum. As shown in FIGURES 4–7, the tubular body portion 56 is fitted at each end over a corresponding cylindrical flange portion 59 on either the ring 50 or gear 46.

Referring more particularly to FIGURES 2 and 6, fastened within the drum 4 are a plurality of longitudinally extending, circumferentially-spaced bars 60 each having a first portion 60a contiguous with the sheet 56, a second portion 60b extending radially inwardly of the drum and a bent extremity 60c that is bent rearwardly relative to the direction of rotation of the drum 4. Similarly, blades 18 have free extremity portions 18a bent rearwardly relative to the direction of rotation of the blade means. The bars 60 are slidable in corresponding grooves contained in end gear 46 and ring 50, and are fastened to sheet 56 by wing nut 58.

The crab cores, which have been previously cut horizontally to remove the back fins and to expose sections of the remaining "white" or "regular" meat, are introduced between the beater means and the drum, and the meat and shell components are separated by the simple knocking, banging or shaking operation to which the cores are subjected. The crab meat flakes thus produced pass radially outwardly via the passages 58 and are deposited by gravity on conveyor 10 and are transported into the bin 14. The shell components from the particles are transported toward the discharge end of the drum during rotation thereof, and are deposited on the laterally directed chute. In order to assist in this conveyance of the shell constituents in the discharge direction during the rotation of the drum, the discharge end is preferably lowered relative to the inlet end.

In the event that cleaning of the drum is desired, motor 22 is de-energized to discontinue the counter-rotation of drum 4 and blade means 16, whereupon wing nuts 58 are unfastened and bars 60 are longitudinally removed. The drum 4 is now rinsed with pressure liquid to open any of those passages 58 that might possibly have been clogged during use. Following cleaning, the bars 60 are refastened within the drum, and the motor 22 is restarted to again drive the drum and blade means in opposite directions of rotation.

While in accordance with the provisions of the patent statutes one preferred form and embodiment of the invention has been illustrated and described, it will be apparent to those skilled in the art that changes may be made in the apparatus described without deviating from the invention set forth in the following claims.

What is claimed is:

1. Apparatus for separating pre-cooked unshelled crab particles into their meat and shell components, comprising a frame;
a rotatably-driven generally horizontal tubular drum journalled in said frame and having an input end adapted to receive said crab particles and an output end adapted to discharge the shell components, said tubular drum containing throughout its length a plurality of radial meat transporting passages;
rotatably-driven blade means journalled in said frame and arranged concentrically within said drum, said drum and said blade means being driven in opposite directions; and
a plurality of longitudinally extending circumferentially spaced radially arranged bars attached to the inner circumference of said drum, said bars being spaced from the extremities of said blade means by such a predetermined distance that the shell components are jarred free from said meat components as said crab particles are tumbled by the cooperation between the extremities of said blades and bars, whereby particles of meat are discharged from said drum through the meat transporting passages contained therein,
    wherein the free extremities of said bars adjacent said blade means include bent portions that extend rearwardly relative to the direction of rotation of said drum.

2. Apparatus as defined in claim 1, wherein said blade means comprise a plurality of radially extending blades the free extremities of which include bent portions that extend rearwardly relative to the direction of rotation of said blade means.

3. Apparatus as defined in claim 2 wherein each of said meat transporting passages diverges outwardly in the radial direction of said drum.

4. Apparatus as defined in claim 3 wherein the input end of said drum has a slightly higher elevation than the discharge end, and further including discharge means arranged at said discharge end of said drum for collecting the shell particles discharged from the annular space between said blade means and said drum.

5. Apparatus as defined in claim 4, and further including endless conveyor means arranged beneath said drum for transporting the meat particles that are passed through said passages.

6. Apparatus as defined in claim 1, and further including releasable fastener means operable to permit removal of said bars longitudinally of said tubular drum.

7. Apparatus as defined in claim 1 wherein the speed of rotation of said blade means is greater than the rotational speed of said drum, and further wherein the relative speeds of rotation of said drum and blade means are adjustable.

References Cited

UNITED STATES PATENTS

| | | | |
|---|---|---|---|
| 2,879,538 | 3/1959 | Peuss | 17—2 |
| 2,915,781 | 12/1959 | Woolf et al. | 17—2 |
| 3,238,560 | 3/1966 | Jurisich | 17—5 X |
| 3,256,555 | 6/1966 | Paoli | 17—1 |

LUCIE H. LAUDENSLAGER, *Primary Examiner.*